(12) United States Patent
Kurihara

(10) Patent No.: US 7,552,194 B2
(45) Date of Patent: Jun. 23, 2009

(54) CONTENT DELIVERY SYSTEM AND CONTENT DELIVERY APPARATUS

(75) Inventor: Junichi Kurihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 875 days.

(21) Appl. No.: 10/634,101

(22) Filed: Aug. 4, 2003

(65) Prior Publication Data
US 2004/0098470 A1   May 20, 2004

(30) Foreign Application Priority Data
Aug. 7, 2002   (JP) ............................. 2002-229596

(51) Int. Cl.
*G06F 15/16* (2006.01)
(52) U.S. Cl. ...................... 709/217; 709/231
(58) Field of Classification Search ................. 709/217; 705/10
See application file for complete search history.

(56) References Cited

U.S. PATENT DOCUMENTS

| | | | | |
|---|---|---|---|---|
| 6,154,771 | A * | 11/2000 | Rangan et al. ............... | 709/217 |
| 6,385,596 | B1  | 5/2002  | Wiser et al. | |
| 6,401,075 | B1 * | 6/2002 | Mason et al. .................. | 705/14 |
| 6,487,538 | B1 * | 11/2002 | Gupta et al. ................... | 705/14 |
| 6,629,104 | B1 * | 9/2003 | Parulski et al. ............... | 707/102 |
| 6,832,253 | B1 * | 12/2004 | Auerbach ..................... | 709/217 |
| 6,845,388 | B1 * | 1/2005  | Philyaw ....................... | 709/204 |
| 6,847,969 | B1 * | 1/2005  | Mathai et al. ................ | 709/217 |
| 6,968,364 | B1 * | 11/2005 | Wong et al. .................. | 709/217 |
| 7,020,888 | B2 * | 3/2006  | Reynolds et al. ............. | 709/219 |
| 7,249,059 | B2 * | 7/2007  | Dean et al. .................... | 705/26 |
| 7,379,901 | B1 * | 5/2008  | Philyaw ........................ | 705/26 |

FOREIGN PATENT DOCUMENTS

| | | |
|---|---|---|
| EP | 1 164 503 | 12/2001 |
| EP | 1164503 A2 * | 12/2001 |
| JP | 11 136618 | 5/1999 |
| JP | 2001 357222 | 12/2001 |
| JP | 2002 99740 | 4/2002 |

* cited by examiner

*Primary Examiner*—Larry D Donaghue
*Assistant Examiner*—Jeffrey R Swearingen
(74) *Attorney, Agent, or Firm*—Frommer Lawrence & Haug LLP; William S. Frommer; Paul A. Levy

(57) ABSTRACT

A content delivery system is disclosed which connects users' terminal apparatuses to a content management unit of a service provider managing a plurality of contents via a computer network, the service provider delivering the contents to the users over the computer network. The content management unit includes: a content file storing element for storing files of the contents; a user-oriented content storing element in which a user area of a predetermined size is allocated to each of the users for the storage of a content owned by the corresponding user; a file managing element for managing the content files stored in the content file storing element and the contents stored in the user areas of the user-oriented content storing element; and a content delivering element for providing the users with streaming delivery of the contents stored in the user areas. Each of the users is charged a usage fee proportional to the user area size allocated to the corresponding user in the user-oriented content storing element.

10 Claims, 6 Drawing Sheets

FIG. 3

| USER ID | FILE NAME | DATE OF APPLICATION | SCHEDULED DATE OF FILE REGISTRATION | FILE SIZE | GENRE | SCHEDULED DATE OF DELIVERY |
|---|---|---|---|---|---|---|
| 001 | news8 | 10/2 | 10/8 | 40 | news | 10/8 |
| 001 | anime45 | 10/3 | 10/7 | 80 | anime | 10/7 |
| 001 | news21 | 10/6 | 10/21 | 40 | news | |

F I G. 4

| FILE NAME | DATE OF REGISTRATION | GENRE | FILE SIZE | FILE FORMAT | PRICE | CONTENT DETAIL |
|---|---|---|---|---|---|---|
| news19 | 10/19 | news | 40 | MPEG1 | 0 | NCV NEWS AT 15:00 ON OCTOBER 19 |
| news21 | 10/21 | news | 40 | MPEG1 | 0 | NCV NEWS AT 15:00 ON OCTOBER 21 |
| anime45 | 10/19 | anime | 80 | MPEG1 | 300 | EPISODE 2 OF "THE ADVENTURE OF TRACK" ON OCTOBER 7 |
| sport18 | 10/18 | sport | 40 | MPEG1 | 100 | "SPORT TODAY" ON OCTOBER 18 |
| ...... | ...... | ...... | ...... | ...... | ...... | ...... |

FIG. 5A

| USER ID | TOTAL AVAILABLE SIZE | USED SIZE | REMAINING SIZE | STORAGE AREA LOCATION |
|---|---|---|---|---|
| 001 | 1000 | 800 | 200 | C1–C7 |
| 002 | 1000 | 1000 | 0 | C8–CE |
| 003 | 4000 | 2820 | 1180 | CF–EC |

FIG. 5B

| USER ID | STORED FILE | GENRE | FILE SIZE | STORAGE AREA |
|---|---|---|---|---|
| 001 | news5 | news | 40 | C1 |
| 001 | news6 | news | 40 | C1 |
| 001 | anime8 | anime | 80 | C2 |
| 001 | news8 | news | 40 | C2 |

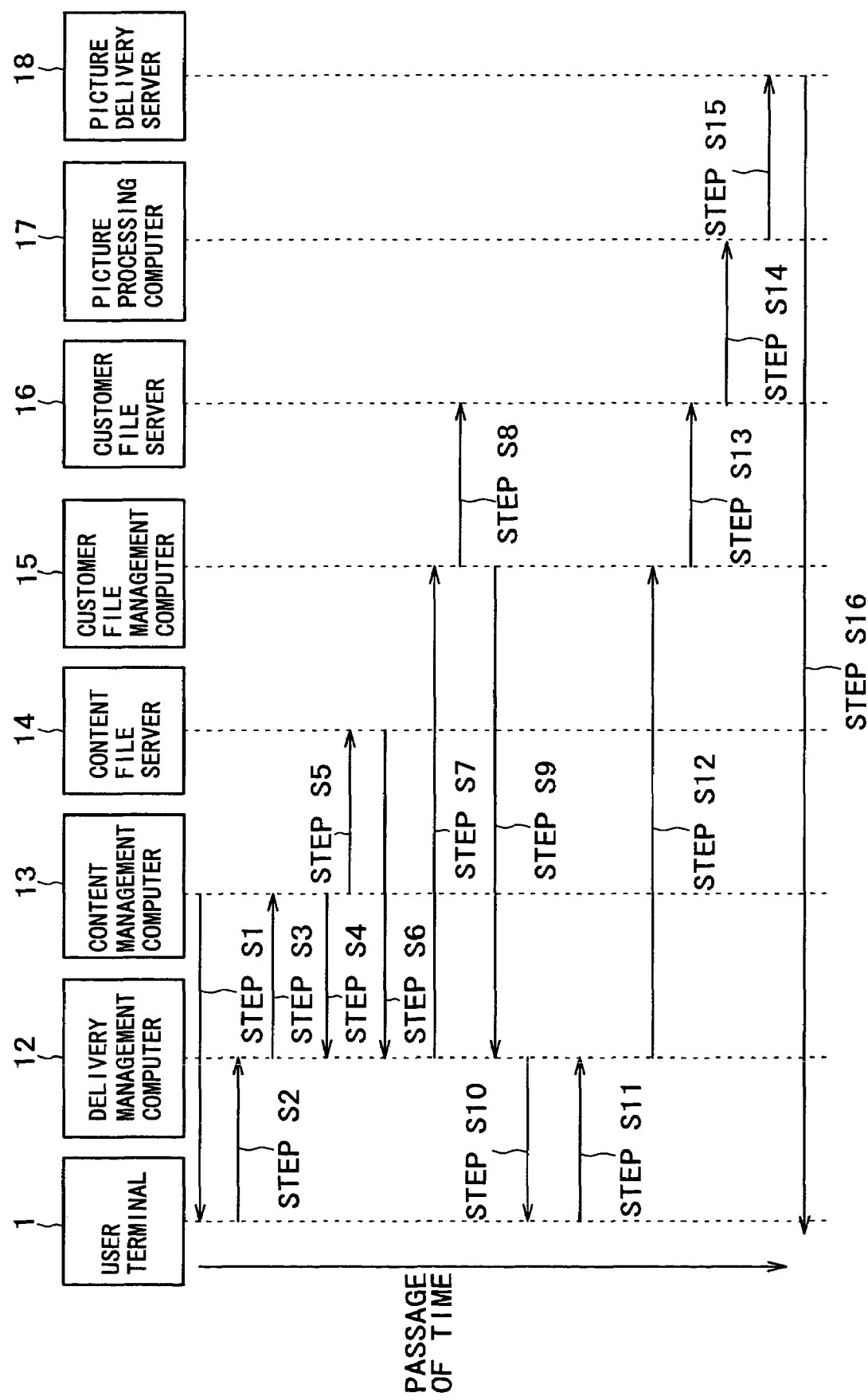

CONTENT DELIVERY SYSTEM AND CONTENT DELIVERY APPARATUS

BACKGROUND OF THE INVENTION

The present invention relates to a content delivery system and a content delivery apparatus for use therewith, the content delivery system providing streaming delivery of contents such as moving picture files via a network such as the Internet.

In recent years, the services of offering, selling and delivering various contents such as still pictures, moving pictures and music to users over a computer network have been getting attention. This type of content delivery service typically involves users each operating a terminal apparatus (called the user terminal hereunder) such as a personal computer to gain access to a server having contents offered for delivery. The server allows a desired content file such as a moving picture ordered for purchase by the user to be downloaded to a hard disc drive or the like in the user terminal. Once downloaded and stored into the user terminal, the purchased file is reproduced by the user for enjoyment. One disadvantage of this conventional content delivery service is that because the content file is copied to the user terminal, illegal copies can be made of this copied file and such unlawful copies can be released to the public domain including the Internet.

Meanwhile, a so-called streaming delivery service has been proposed whereby content files such as moving pictures and music are not copied but streamed to the user terminal for reproduction. This type of service is supposed to be effective for preventing illegal copies or their illicit release to the public domain because content files are not left in the user terminal.

However, there exists today software that captures screens in streaming reproduction. This software allows streaming delivery of moving pictures or the like to be easily captured into the user terminal. Once taken into the user terminal, the contents can be illegally copied and their unlawful copies distributed as in the case of the conventional content delivery by download. Because the streaming delivery service is designed to distribute the same data concurrently to a large number of users, the destination users cannot all be confirmed or identified. Hence the difficulty in determining which users have made illegal copies of their contents or illicitly distributed such copies.

There is another disadvantage to the proposed service. Because the streaming delivery service delivers the same data to a large number of people at the same time, it is difficult to charge each user for the service rendered, especially for each file delivered to the user in question.

SUMMARY OF THE INVENTION

The present invention has been made in view of the above circumstances and provides a content delivery system and a content delivery apparatus for use therewith, the content delivery system preventing illegal copies of contents such as moving picture files delivered over a network as well as the unlawful distribution of such copies, the system further ensuring collection of a usage fee on each user for the service rendered.

In carrying out the invention and according to one aspect thereof, there is provided a content delivery system for connecting terminal apparatuses of users to a content management unit of a service provider managing a plurality of contents via a computer network, the service provider delivering the contents to the users over the computer network, the content management unit including: a content file storing element for storing files of the contents; a user-oriented content storing element in which a user area of a predetermined size is allocated to each of the users for the storage of a content owned by the corresponding user; a file managing element for managing the content files stored in the content file storing element and the contents stored in the user areas of the user-oriented content storing element; and a content delivering element for providing the users with streaming delivery of the contents stored in the user areas; wherein each of the users is charged a usage fee proportional to the user area size allocated to the corresponding user in the user-oriented content storing element.

According to another aspect of the invention, there is provided a content delivery apparatus including: a content file storing element for storing a plurality of content files; a user-oriented content storing element in which a user area of a predetermined size is allocated to each of users for the storage of a content owned by the corresponding user, the user area size being subject to charging of a usage fee; a file managing element for managing the content files stored in the content file storing element and the contents stored in the user areas of the user-oriented content storing element; and a content delivering element for providing the users with streaming delivery of the contents stored in the user areas.

Where the service of streaming content delivery to users is implemented by use of the above-outlined content delivery system and content delivery apparatus of the invention, each user is reliably charged a usage fee proportional to the user area size allocated to the user in question unlike under the conventional scheme of charging per file. This feature contributes to reducing the burdens on the service provider having to collect usage fees on the delivered contents. According to the invention, a content file is placed (e.g., copied) into each user's user area before the file is streamed to the corresponding user for delivery. This also makes it possible reliably to charge individual users for the streaming delivery of contents on a file-per-user basis. These features constitute a flexible charging scheme: in addition to the fee charged per user area, each user may be charged an additional fee depending on the type of the content streamed to the user for delivery.

Where the inventive system and apparatus implement the service of streaming content delivery to specific users as described, it is possible to perform picture processing on content files in such a manner that each user's personal information including a user ID may be displayed in superposed fashion on a content streaming screen. If any user makes an illegal copy in the user terminal of the moving picture of a delivered content file by use of some software and subsequently releases the unlawful copy to the public domain, the source of the illicit release is immediately identified by the user ID appearing superposed on the streaming screen. This feature serves as a deterrent against the illegal copying of content files delivered by the service provider and against the distribution of such illegal copies.

Other objects, features and advantages of the invention will become more apparent upon a reading of the following description and appended drawings.

BRIEF DESCRIPTION OF THE DRAWINGS

FIG. 3 is a tabular view depicting a typical delivery management database;

FIG. 4 is a tabular view indicating a typical content management database;

FIGS. 5A and 5B are a tabular view of a typical customer database and a tabular view of a typical customer file management database respectively; and FIG. 6 is a flowchart illustrating typical flows of content delivery performed by the content delivery system.

DESCRIPTION OF THE PREFERRED EMBODIMENTS

Figure 1:
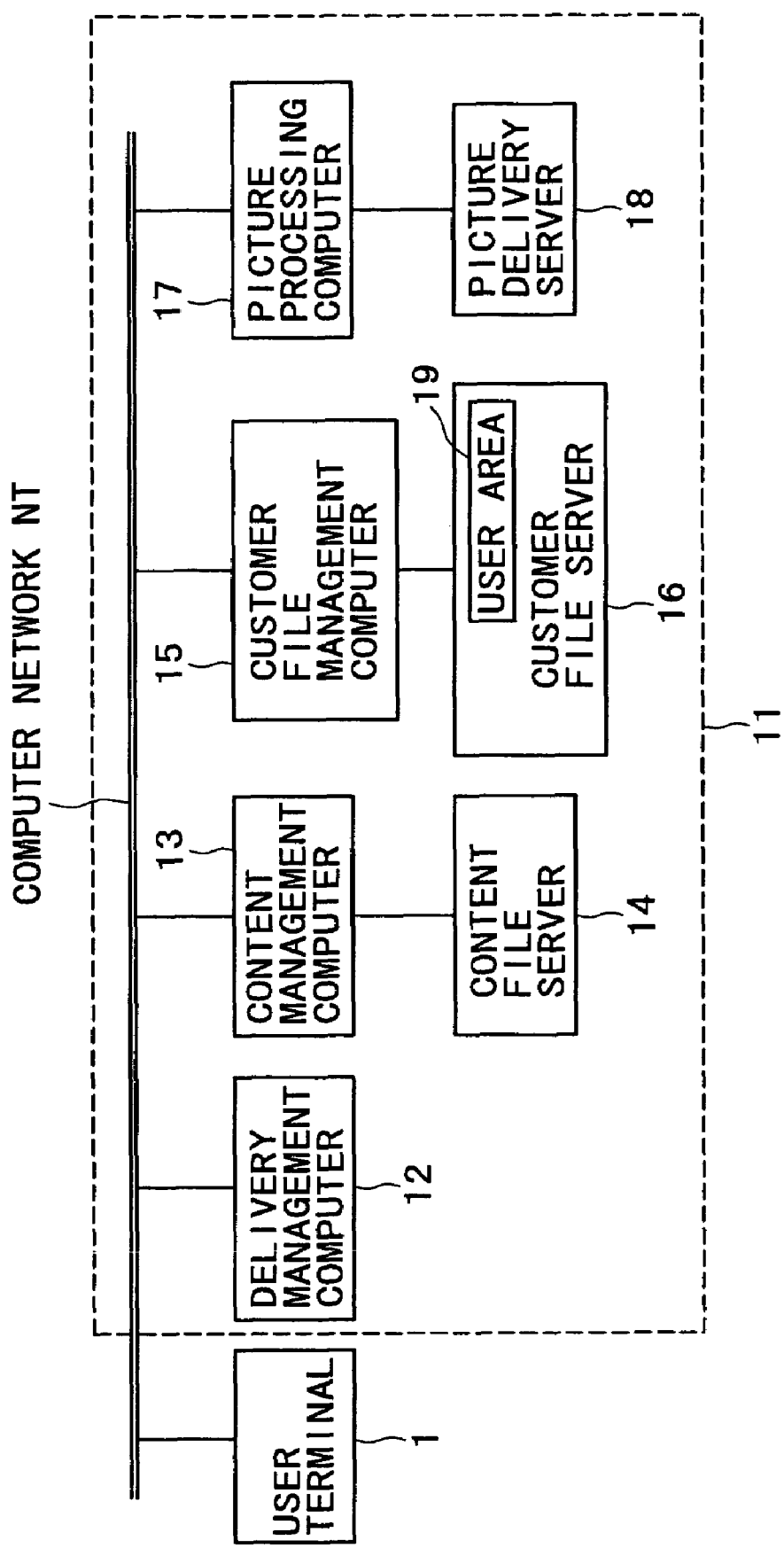
FIG. 1 is a schematic view showing a typical configuration of a content delivery system embodying the invention.

A content delivery system and a content delivery apparatus practiced as preferred embodiments of this invention will now be described in detail with reference to the accompanying drawings.

The content delivery system of this invention allows a user to purchase a desired content from an entity providing the service of offering contents such as moving pictures and music (the entity is called the service provider hereunder) and to receive a streaming delivery of the purchased content. Before the user can enjoy the content delivery service through the inventive system, the user needs to sign up with the service provider for a user area of a predetermined size appropriated for file storage in suitable data storage equipment such as a server administered by the service provider. The user area under contract with the service provider may later be changed in its size if so desired by the user and agreed on by the service provider.

After signing up with the service provider, the user may receive over a computer network information about the offered contents (called content information) such as moving picture files and music files which are owned, managed and marketed by the service provider and which are streamed when reproduced for delivery to the user (the files reproduced for streaming are called content files hereunder). The user looks up the content information offered by the service provider before deciding which content to buy. More specifically, viewing the content information, the user selects a desired content file to be stored into the user area under the user's management and gives instructions specifying that the selected content file be placed into the user area. Given the user's instructions, the service provider copies the selected content file into the user area applicable to the user in question. With the desired content file copied into the user area, the user can receive delivery of the content streaming from the service provider, whereby moving pictures and/or pieces of music can be enjoyed at the user's terminal. The inventive system solely permits streaming delivery of contents as outlined above and will not allow content files to be downloaded and copied to the user's terminal.

The above-mentioned content delivery system charges a usage fee on the user for the user area size appropriated by the user, not for each content file copied into the user area. The charging scheme based on the user area size enables the system to collect fees reliably on the services rendered for the user. The larger the amount of contents the user wants to purchase, the larger the size of the user area needed to accommodate the purchased contents. The service provider can gain more earnings the larger the user area size under contract with each user. This system enables the user to take streaming delivery of the content file copied into the applicable user area. Each individual user receives one content file being streamed, and it is possible for the system to charge unfailingly each of a large number of users on each content file being streamed toward the user in question. It follows that depending on the type of the content file, the user may be charged an additional fee, which further contributes to the service provider's profitability.

There is another advantage of this system for the user. Because the purchased content file is copied to and held in the user area allocated under contract with the service provider, the content can be enjoyed by the user whenever desired, streamed from the user area under the user's own management regardless of whether the service provider currently offers the content file in question.

As described, the inventive system is characterized in that it provides each individual user with streaming delivery of a copied content file from the user's own area, on a one-file-to-one-user basis. If follows that if the content purchased by the user is a moving picture, then specific information identifying the user (called specific information hereunder) can be superposed through suitable processing onto a streaming screen during content file delivery. With such picture processing in place, the user's specific information appears superposed on the streaming screen while the streaming content is being received and reproduced at the user's terminal. The user's specific information superposed on the streaming screen may illustratively be a user ID given upon sign-up with the service provider. The specific information will not become known to other users when displayed on the screen because the information belongs only to the user getting streaming delivery of the content.

Where the user's specific information is superposed onto the streaming screen while the content is being streamed for delivery, the moving picture of the delivered content is taken into the user's terminal together with the specific information about the user who has ordered the delivery. If the user makes an illegal copy of the acquired streaming screen and distributes the copy over the Internet or like network, the source of the unlawful distribution is immediately identified by the information. This feature of the inventive system serves as a deterrent against the illegal copying of content files and the distribution of such illegal copies. The user's specific information to be superposed on the streaming screen is not limited to the user ID; the information may also be personal information such as the user's credit card number, telephone number, address, and name which will embarrass the user if distributed to a large number of people. The items of such personal information may be converted to a symbolic or barcode format that is superposed onto the streaming screen. This also serves as a deterrent against the illegal copying of content files and the distribution of such copies.

This content delivery system manages not only the content files which are already owned and managed by the service provider but also the content files that are scheduled to be added and delivered in the future. The system thus provides content information about the new content files yet to be delivered. Once the soon-to-be-delivered content files arrive at the service provider, the system registers these files in a manner conducive to delivery toward users. If a new content file is ordered by the user for delivery before it arrives at the service provider, the file is copied into the ordering user's user area the moment the file has arrived.

As an alternative to the copying of content files to the user area, a file having reference information linked to the original content file owned by the service provider may be created in the user area. Such a reference information-based file, called the link file, is mainly composed of reference information and has a very small size compared with the original content file containing moving pictures and sound. Thus if link files are created in the user areas instead of the corresponding content files being copied thereto, it is possible to reduce the storage capacity allocated for user area purposes in the storage equipment of the service provider. It might happen that while a link file is held in the user area, the original content file is to be deleted illustratively when a contract term expires. In such a case, the original content file needs to be copied into the user area so that the purchased content is kept ready for reproduction and enjoyment unless and until it is deleted by the user.

(1) Overall Configuration of the Content Delivery System

Described below is a typical system configuration in which the above-described content delivery system is implemented.

FIG. 1 schematically shows an overall configuration of the content delivery system. In this setup, a user terminal 1 of the user ordering purchase of a content from a service provider is connected via a computer network NT such as the Internet to a content management unit 11 of the service provider selling and delivering the purchased content file. The user terminal 1 may be connected to the computer network NT either directly or through an ISP (Internet service provider) by way of a telephone line network or an optical fiber network. The user terminal 1 may be connected to the computer network NT in wired or wireless fashion where the above-described type of connection can be established.

When thus connected to the computer network NT, the user terminal 1 uses illustratively TCP/IP protocols to set up a transmission channel over the computer network NT. The channel allows the user terminal 1 to exchange content files with the service provider having the content management unit 11 and to send instructions for looking up prospective files and placing an order for a desired file with the content management unit 11.

Figure 2:
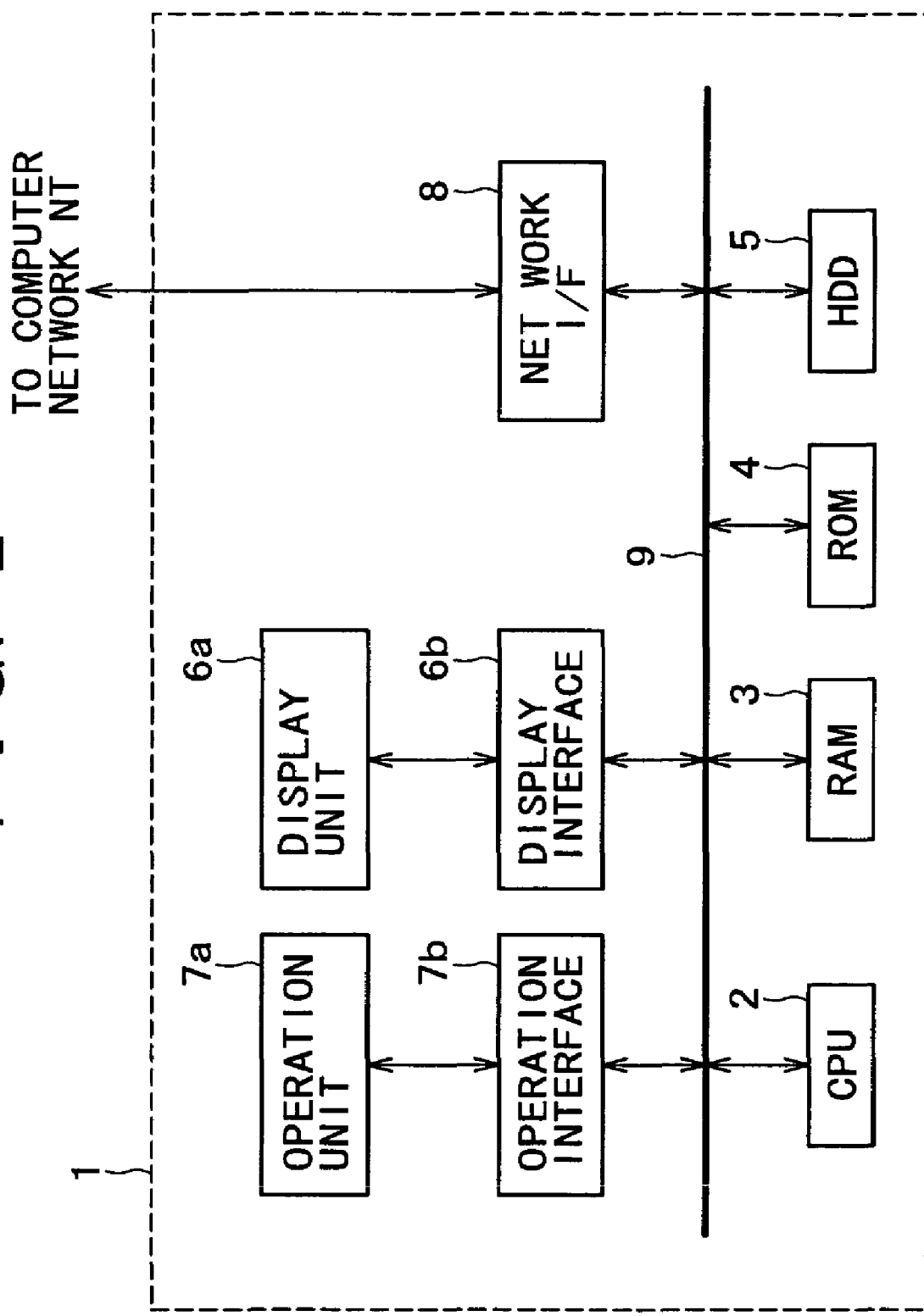
FIG. 2 is a schematic block diagram of a user terminal as part of the content delivery system.

The user terminal 1 is illustratively a consumer-oriented personal computer. As shown in FIG. 2, the user terminal 1 includes: a CPU (central processing unit) 2 for performing arithmetic operations and providing overall control on the configured components; a RAM (random access memory) 3 functioning as a work area for the CPU 2; a ROM (read only memory) 4 containing programs and data that can only be read for use by the CPU 2; an HDD (hard disc drive) 5 which stores an operating system, application programs and others to be run by the CPU 2 and to and from which various data and files are written and read; a display unit 6a for displaying diverse items of information; a display interface 6b for permitting data exchanges between the display unit 6a and the CPU 2; an operation unit 7a operated by the user to enter various data and instructions; an operation interface 7b for permitting data exchanges between the operation unit 7a and the CPU 2; and a network interface 8 for exchanging data and files with the service provider through the computer network. Of these components of the user terminal 1, the CPU 2, RAM 3, ROM 4, HDD 5, display interface 6b, operation interface 7b, and network interface 8 are connected to a bus 9. The bus 9 allows data and signals to be exchanged between the interconnected components.

The CPU 2 provides overall control over the components of the user terminal 1 and executes the operating system and various application programs held illustratively on the HDD 5. In particular, the CPU 2 carries out an application program designed specifically to exchange content files with the content management unit 11 of the service provider.

The RAM 3 serves as the work area in which programs are executed by the CPU 2, and temporarily stores various data under control of the CPU 2. The ROM 4 accommodates diverse programs and setting information that are read upon start-up of the user terminal 1 for use by the CPU 2. The HDD 5 retains the operating system and application programs. The HDD 5 also allows programs and various files of data to be written and read thereto and therefrom as requested by the CPU 21.

The display unit 6a is illustratively formed by an LCD (liquid crystal display) whose display screen displays diverse items of information for viewing by the user under control of the CPU 2. In particular, the display unit 6a displays on its screen a graphical user interface (GUI) which displays not only the result of the programs having been executed under control of the CPU 2 in order to exchange content files with the content management unit 11 of the service provider; the GUI also displays buttons manipulated by the user to operate these programs. The display interface 6b permits exchanges of data and display requests between the CPU 2 and the display unit 6a. The display interface 6b also causes the display unit 6a to display various items of information and the GUI when so requested by the CPU 2.

The operation unit 7a is constituted by a user interface including illustratively a keyboard, a pointing device such as a mouse, and a rotary operation switch known as a jog dial. The operation interface 7b supplies the CPU 2 with control signals representative of the operation details performed by the user on the operation unit 7a.

The network interface 8 interfaces communications with the outside under control of the CPU 2. Specifically, it is through the network interface 8 that the user terminal 1 connects to the computer network NT and exchanges various items of information with the content management unit 11 of the service provider.

In the description above, the user terminal 1 was shown to be a consumer-oriented personal computer. However, this is not limitative of the invention. Alternatively, the user terminal 1 may be constituted by any one of diverse PDAs (personal digital assistants) or other information processing equipment such as portable telephones incorporating a variety of communication functions.

The content management unit 11 of the service provider is configured by a plurality of component computers and servers implementing the features necessary for the services to be offered. Each of these components has a structure similar to that of the user terminal 1. More specifically, as shown in FIG. 1, the content management unit 11 includes: a delivery management computer 12 for managing the delivery of contents to users; a content management computer 13 for managing diverse content files offered to users for sale; a content file server 14 for storing these content files; a customer file management computer 15 for managing the content files purchased by the users; a customer file server 16 for storing the content files purchased by the users; a picture processing computer 17 for performing picture processing on the content files requested by the users for delivery; and a picture delivery server 18 for providing users with streaming delivery of the content files having undergone the picture processing.

The computers and severs making up the content management unit 11 are personal computers each having a structure similar to that of the user terminal 1. Each of these computers and servers is arranged to process large quantities of data at high speed. The high-speed bulk data processing is implemented by these computers and servers using higher data processing capacities and larger storage area sizes than those of the user terminal 1. The display unit 6a and operation unit 7a attached to the user terminal 1 may be omitted from the computers and servers constituting the content management unit 11. The component computers and servers of the unit 11 are interconnected via the computer network NT to exchange signals and files therebetween. Alternatively, the computers and servers making up the content management unit 11 may be interconnected via a network inside the unit 11 while also being connected to the external computer network NT through a communication interface such as a router coupled to the internal network of the unit 11.

The delivery management computer 12 is connected to the computer network NT. Upon receipt of a content file purchase request (i.e., delivery instruction information) from the user terminal 1, the delivery management computer 12 establishes accordingly a database called a delivery management database containing user-specific delivery management information. In accordance with the delivery management database thus established, the delivery management computer 12 manages the delivery of contents to users and transfers relevant delivery management information to the computers in the content management unit 11 over the computer network NT. The delivery instruction information sent from the user terminal 1 to the delivery management computer 12 includes at least a user ID and a file name per user. The delivery management database established on the basis of the received delivery instruction information supplements the information with a date of application, a scheduled date of file registration, a file size, a genre, and a date of completion of file transfer per user ID, as shown in FIG. 3. The user ID contained in the delivery instruction information from each user is made up of a number, a symbol, a text or other suitable identifier allowing the user in question to be uniquely identified. Each user is granted a user ID illustratively upon signing up with the service provider. The content file name is a unique name identifying each content file.

The content management computer 13 is connected to the computer network NT and retains content information about the content files stored in the content file server 14, illustratively in the form of a content management database shown in FIG. 4. In accordance with such a content management database, the content management computer 13 manages the content files held in the content file server 14.

What follows is a description of the content information stored in the content management computer 13. The content information includes at least file names and dates of registration. As shown in FIG. 4, the information may be supplemented with genres, file sizes, file formats, content details, and copyright information such as prices to be paid for making a copy. The file name is a unique name identifying each content file. The date of registration is a date on which the content file of interest was or will be registered with the content file server 14. The genre is information indicating a predetermined category to which the content file of interest belongs. The file size is the size of each content file. The file format is information indicating the format in which each content file is prepared. The content detail is text-based information explaining what is contained in each content file.

Although the example of FIG. 4 shows the file sizes listed in bytes, this is not limitative of the invention. Alternatively, the file sizes may be indicated in parameters specific to each content file. Illustratively, a moving picture file may be listed with the time required to reproduce the file. The content detail may include a still or moving picture representative of the file as well as a sound bite outlining audibly the content in question.

The content management computer 13 provides users with the content information based on the above-described content management database. With the content delivery system of this invention in place, the user refers to the content information provided by the content management computer 13 before deciding which content file to buy.

On receiving a content file search request from the user, the content management computer 13 starts searching for the requested content file through the content file server 14. The search for the content file is made illustratively through the records constituting the content management database. The result of the search may be displayed on the user terminal 1. If new information is added about any content file in the content file server 14, the content management computer 13 enters the newly added information into the content management database.

The content management computer 13 manages not only the content files already stored in the content file server 14 but also those scheduled to be offered anew in the future. Upon request by the user, the content management computer 13 provides content information about the soon-to-be-offered content files. When the content files scheduled to be offered anew have actually arrived at the service provider, the content management computer 13 registers the new files with the content file server 14.

The content file server 14 has a mass storage device capable of accommodating varieties of content files offered to users for sale. Given a search start instruction from the content management computer 13, the content file server 14 searches the stored content files for a designated content file. In the case of a hit, the content file server 14 transfers the detected content file to the customer file server 14 in a manner to be described below.

The customer management computer 15 is connected to the computer network NT and has databases which, as shown in FIGS. 5A and 5B, record information about the sizes of the user areas allocated to users under contract with the service provider, as well as information about the content files held in these user areas. FIG. 5A shows a typical structure of a customer database retaining information about the user areas allocated to contract users 001, 002, 003, etc. The information per user in the customer database includes a total user area size, a consumed user area size, a remaining user area size, and user area-related information indicating where the area for a given user is allocated in the customer file server 16. FIG. 5B indicates a typical structure of a customer file management database holding information about the content files stored in the user areas of a given user (e.g., user 001 ). The information in the customer file management database includes names of files holding the content files, genres of the content files, sizes of the files, and information about the storage areas for the files.

In accordance with the above-described databases, the customer file management computer 15 manages the content files purchased by individual users. Upon receipt of a request from the user terminal 1 to search for, transfer, delete or otherwise process any content file, the customer file management computer 15 causes the customer file server 16 to start executing the requested process. If the delivery management computer 12, upon purchase of a new content file by a user, instructs the customer file management computer 15 to add the new content file to the applicable user's storage area, the customer file management computer 15 detects the corresponding content file from a search through the content file server 14 and causes the server 14 to copy the detected file to the user area allocated to the user in the customer file server 16.

The customer file server 16 is connected to the computer network NT and has user areas 19 allocated to each user under contract with the service provider. In this example, a total available user area size is determined beforehand for each user by the customer file server 16 according to the contract in effect between each user and the service provider. The predetermined total available user area size serves as a basis for establishing an allocated storage area for each user as the user area 19. The contract term, total available storage size, or other parameters of the user area 19 for each user may be changed if the user and the service provider agree to modify relevant conditions in the contract.

With the inventive system in use, each user is charged a usage fee depending on the size of the user area 19, and pays the fee to the service provider for the services received. This charging method allows usage fees to be reliably paid from the users to the service provider. The larger the amount of the contents the user wants to purchase, the larger the size of the user area 19 for storing the purchased contents. The storage sizebased charging scheme is particularly beneficial to the service provider in that the scheme provides more earnings the larger the sizes of the users areas 19 allocated under contract with the users.

The customer file server 16 has the user area 19 in which to store the content files purchased by a plurality of users. This feature is implemented by use of a mass storage device.

When requested by the customer file management computer 15 to search for, transfer, delete or add any content file, the customer file server 16 starts carrying out the requested process as mentioned above. Upon request by the customer file management computer 15 to add a new content file, the customer file server 16 stores onto a specific storage medium the content file copied to the applicable user's user area 19, so that subsequent search for the file in question can be made easily.

It is not mandatory to copy the content file to the user area 19 for storage. Instead, a link file linked to the original content file held in the content file server 14 may be created in the user area 19. Such link files are each constituted mainly by reference information and have a very small file size compared with the corresponding original content files containing moving pictures, still pictures and/or sounds.

Where a link file is created in each user's user area 19 instead of the original content file being copied thereto, it is possible to reduce the storage size actually consumed in the user areas for multiple users within the customer file server 16. In such cases, the used size of the user area 19 is nevertheless changed in proportion to the actual size of the original content file. In that manner, while each user's user area is consumed every time the user purchases a content file, the actual disc space used up within the customer file server 16 is reduced significantly.

The picture processing computer 17 performs picture processing on the content file purchased by the user so that when the content is being streamed to the user terminal 1 for reproduction, the user's specific information such as the user ID will appear superposed on the streaming screen. The picture processing by the computer 17 may be implemented using known picture processing techniques for superposing text or the like onto a reproduced screen of moving pictures.

The picture delivery server 18 provides the user with streaming delivery of the content file which was subjected to the picture processing by the picture processing computer 17 and which has been transferred from the computer 17 to the server 18.

The above-described computers and servers making up the content management unit 11 are consumer-oriented personal computers, each in charge of specific functions assigned thereto. These component computers and servers were shown interconnected via the computer network NT to exchange content files and signals therebetween. However, this structure is not limitative of the invention. Alternatively, suitable application programs implementing the functions of these computers and servers may be run on one data processing apparatus so that the single apparatus may constitute the content management unit 11.

While the computers and servers described above are housed within the same content management unit 11 of the inventive content delivery system, this is not limitative of the invention. These components may be run by separate companies or by different departments of a company located in a dispersed manner.

(2) Delivery Operations by the Content Delivery System

Described below with reference to FIG. 6 is how the content delivery system of the invention operates in delivering contents to users. For the example of FIG. 6, it is assumed that the content management computer 13 holds in advance content information such as that shown in the content management database of FIG. 4 and that the customer file management computer 15 retains beforehand customer data such as those in the customer database of FIG. 5A.

Through the user terminal 1 connected to the computer network NT, the user first acquires from the content management computer 13 content information about the content files held in the content file server 14 (in step S1). The content information may be obtained either by e-mail transmission from the content management unit 11 or on the user's own initiative through access to the content management unit 11 using the user terminal 1.

The user refers to the content information acquired from the content management unit 11, signs a contract with the service provider based on the information, and selects a desired content file to be stored into the user area 19 allocated in the content management unit 11. Information about the selected content file is transmitted as delivery instruction information to the delivery management computer 12 in the content management unit 11 (in step S2). The delivery instruction information sent by the user should include at least a user ID obtained upon sign-up with the service provider and the file name of the selected content file.

Given the delivery instruction information from the user, the delivery management computer 12 establishes delivery management information based on the received information, and requests the content management computer 13 to check whether the content file designated by the delivery instruction information as the file desired to be purchased by the user already exists in the content file server 14 (in step S3). Given the request for the check from the delivery management computer 12, the content management computer 13 searches for the file in question through the content management database attached to the computer 13. The result of the search is returned to the content management computer 13 (in step S4).

If the content file designated in the delivery instruction information is found to exist in the content file server 14, the content management computer 13 instructs the content file server 14 to transfer the content file in question to the delivery management computer 12 (in step S5). Given the instruction from the content management computer 13, the content file server 14 searches for the designated content file and transfers the detected file to the delivery management server 12 (in step S6).

Upon receipt of the content file from the content file server 14, the delivery management computer 12 transfers to the customer file management computer 15 the received content file and the user-related information included in the delivery management information such as the user ID (in step S7).

The customer file management computer 15 checks to see if the available size of the user area 19 assigned to the user who sent the delivery instruction information is greater than the total size of the content file designated in the delivery instruction information. The check is done based on the user-related information coming from the delivery management computer 12 as well as on the customer database attached to the customer file management computer 15. If the available user area size is judged to be greater than the file size, the customer file management computer 15 instructs the customer file server 16 to copy the content file into the user area 19 (in step S8). Illustratively, where delivery instruction information such as that in the delivery management database of FIG. 3 is transmitted from the user 001, the user area 19 allocated to the user 001 still has an enough capacity to let the entire content file designated in the delivery instruction information be copied into the area 19, as shown in the customer database of FIG. 5A. Suppose then that the delivery instruction information shown in FIG. 3 is sent from the user 002. In that case, all the user area assigned under contract to the user 002 has been exhausted (i.e., the remaining size is 0) and can no longer accommodate the newly transferred content file even if a copy of the new file to the area is designated. In step S8, the storage area information and content information included in the copy instruction are written to the customer file management database attached to the customer file management computer 15.

In keeping with the copy instruction from the customer file management computer 15, the customer file server 16 copies the content file in question to the designated storage area in the user area 19 of the server 16 for storage. After the copying of the file to the user area 19, the customer file management computer 15 reports completion of the copying to the delivery management computer 12 (in step S9). Given the report from the customer file management computer 15, the delivery management computer 12 reports to the user that storage of the file into the content management unit 11 is complete and that the content file desired to be purchased is now available for viewing (in step S10). The report in step S10 is made illustratively by e-mail. Alternatively, before receiving the report in step S10, the user may operate the user terminal 1 to look up progress status information in the delivery management computer 12 to verify whether storage of the desired content file has been completed. The reporting or the verification of the file storage completes the file storage operations to the user area 19 in the content management unit 11.

In step S8, the copy instruction given by the customer file computer 15 to the customer file server 16 may be replaced by an instruction causing the server 16 to create a link file linked to the original content file held in the content file server 14. When such a link file creation instruction is given to the customer file server 16, the available size of the applicable user area 19 is reduced in a customer database record in proportion to the size of the original content file even though the size of the like file is very small compared with that of the original content file.

A series of operations are carried out as described above to store the desired content file into the user area 19 according to each user's request. In addition to these operations, the delivery management computer 12 may perform such processes as billing users for the purchased content files as part of content file management and reporting the remaining availability of the user area 19 to each user.

Following the above-described series of file storage operations to the user area 19, the user is allowed to view the content file being reproduced. Described below in steps is how the user's request to view a desired content leads to reproduction of the picture from the content file.

In step S10, the user is given a report saying that storage of the desired content file into the user area 19 of the content management unit 11 has been completed. The user is now able to request the content management unit 11 to provide viewing of the content file in question. The user transmits a viewing request through the user terminal 1 to the delivery management computer 12 designating the content file desired to be viewed (in step S11).

On receiving the viewing request from the user, the delivery management computer 12 instructs the customer file management computer 15 to deliver the content requested to be viewed by the user (in step S12). Based on the delivery instruction from the delivery management computer 12, the customer file management computer 15 spots the applicable content file in the customer file management database and instructs the customer file server 16 to transfer the detected content file to the picture processing computer 17 (in step S13). Given the instruction from the customer file management computer 15, the customer file server 16 transfers the content file requested for viewing toward the picture processing computer 17 from the user area 19 of the user who sent the viewing request (in step S14).

Where this system is in use, each user is charged a usage fee for the size of the user area 19 allocated under contract to the user as described above. The system also provides each user with streaming delivery of a particular content file copied to the user area 19 on a file-per-user basis. In other words, each user can be billed and pay for each content file delivered, as opposed to conventional cases where file contents are delivered in streaming fashion to an unspecified large number of people who could not be charged for the files so delivered.

If a link file is created to represent an actual content file instead of the actual file being copied into the customer file server 16, then the operations of steps S12 and S13 are performed by the content management computer 13.

Given the content file from the customer file server 16, the picture processing computer 17 performs picture processing on the received file in such a manner that the user's specific information such as the user ID will appear superposed on the streaming screen. The content file thus processed is transferred from the picture processing computer 17 to the picture delivery server 18 (in step S15). The user's specific information to be superposed on the streaming screen is not limited to the user ID; the information may also be personal information such as the user's credit card number or telephone number which will embarrass the user if distributed to a large number of people. The picture processing by the picture processing computer 17 may be performed in advance while the target content file is being held in the customer file server 18.

From the picture delivery server 18, the user receives streaming delivery of the content having undergone the picture processing (in step S16). This allows the user to view the suitably processed moving picture reproduced in streaming fashion on the user terminal 1.

As described above, the content delivery system embodying this invention submits the content file to picture processing such that specific information composed of the user's personal information is made to appear superposed on a streaming screen displaying the reproduced content. It is only through such picture processing that each content file is delivered to the user in streaming format. Whenever the content file is streamed to and reproduced on the user terminal 1, the user's specific information is displayed in superposed relation to the streaming screen. If the content file delivered by streaming is captured by some software into the user terminal 1, the user's specific information is also captured in a manner ready to be displayed along with the content. It follows that if an illegally copied content is released from the user terminal 1 into the public domain such as the Internet, the user ID or other specific information allows the source of the unlawful copy to be readily identified. This feature prevents or strongly discourages the illegitimate copy or release of the contents delivered by the service provider.

As many apparently different embodiments of this invention may be made without departing from the spirit and scope thereof, it is to be understood that the invention is not limited to the specific embodiments thereof except as defined in the appended claims.

What is claimed is:

1. A content delivery system for connecting terminal apparatuses of users to a content management unit of a service provider managing a plurality of contents via a computer network, said service provider delivering said contents to said users over said computer network, said content management unit comprising:
   content file storing means for storing files of said contents;
   user-oriented content storing means in which a user area of a predetermined size is allocated to each of said users for the storage of a content owned by a corresponding one of the users;
   file managing means for managing the content files stored in said content file storing means and the contents stored in the user areas of said user-oriented content storing means, wherein the file managing means copies content files selected by the user from the content file storing means to the corresponding user area;
   content delivering means for providing said corresponding user with said contents stored in said corresponding user area, the contents provided to the corresponding user solely as streaming content wherein the content files are not downloadable for permanent storage by the corresponding user; and
   superposing means for discouraging illegitimate copying of the content files by superposing personal information, by the content provider, including a user-identification that identifies the corresponding user on the streaming content provided by the content delivering means so the superposed personal information is displaying when the streaming content is reproduced,
   wherein the personal information includes at least a corresponding user's credit card number,
   wherein each of said corresponding users is charged a usage fee proportional to the user area size allocated to the corresponding user in said user-oriented content storing means.

2. The content delivery system according to claim 1, wherein said content files are moving picture files.

3. The content delivery system according to claim 2, wherein said content management unit further comprises picture processing means for carrying out picture processing to superpose personal information about the corresponding user on a streaming screen of the content being delivered to the corresponding user.

4. The content delivery system according to claim 1, wherein a copied content file is stored into said user area of the corresponding user as the content owned by the corresponding user.

5. The content delivery system according to claim 1, wherein a link file linked to a content file is stored into said user area of the corresponding user in lieu of the content owned by the corresponding user.

6. A content delivery apparatus comprising:
   content file storing means for storing a plurality of content files;
   user-oriented content storing means in which a user area of a predetermined size is allocated to a corresponding user for the storage of a content owned by the corresponding one of the users, the user area size being subject to charging of a usage fee;
   file managing means for managing the content files stored in said content file storing means and the contents stored in the user areas of said user-oriented content storing means, wherein the file managing means copies content files selected by the user from the content file storing means to the corresponding user area;
   content delivering means for providing said corresponding user with streaming delivery of said contents stored in said corresponding user area, the contents provided to the corresponding user solely as streaming content wherein the content files are not downloadable for permanent storage by the corresponding user; and
   superposing means for discouraging illegitimate copying of the content files by superposing personal information, by the content provider, including a user-identification that identifies the corresponding user on the streaming content provided by the content delivering means so the superposed personal information is displaying when the streaming content is reproduced and identifies the source of the illegitimate copy,
   wherein the personal information includes at least the corresponding user's credit card number,
   wherein each of said corresponding users is charged a usage fee proportional to the user area size allocated to the corresponding user in said user-oriented content storing means.

7. The content delivery apparatus according to claim 6, wherein said content files are moving picture files, said content delivery apparatus further comprising picture processing means for carrying out picture processing to superpose personal information about the corresponding user on a streaming screen of the content being delivered to the corresponding user; and
   wherein said content delivering means provides said corresponding user with streaming delivery of the contents having undergone said picture processing.

8. A content delivery method, comprising:
   storing content files selectable by a user by a content provider;
   copying content files selected by the user to a user-oriented storage area corresponding to the user, said user-oriented storage area managed and allocated by the content provider;
   providing the content files from the user-oriented storage area only to the corresponding user and providing the contents files to the corresponding user solely as streaming content wherein the content files are not downloadable for permanent storage by the corresponding user;
   discouraging illegitimate copying of the content files by superposing personal information, by the content provider, including a user-identification that identifies the corresponding user on the streaming content of the providing step so the superposed personal information is displaying when the streaming content is reproduced and identifies the source of the illegitimate copy;
   wherein the personal information includes at least the corresponding user's credit card number; and
   charging the corresponding user a usage fee proportional to the size allocated to the user-oriented area of the corresponding user.

9. The method of claim 8, wherein the personal information includes a corresponding user identification.

10. The method of claim 8, wherein the personal information includes the corresponding user's credit card number, telephone number, address, and name.

* * * * *